United States Patent [19]

Mizuno

[11] Patent Number: 4,550,004
[45] Date of Patent: Oct. 29, 1985

[54] METHOD OF PRODUCING RADIAL TYPE CERAMIC TURBINE ROTOR

[75] Inventor: Takeyuki Mizuno, Toyohashi, Japan

[73] Assignee: NGK Insulators, Ltd., Japan

[21] Appl. No.: 557,923

[22] Filed: Dec. 5, 1983

[30] Foreign Application Priority Data

Dec. 15, 1982 [JP] Japan .................... 57-219671

[51] Int. Cl.[4] .............................. C04B 35/64
[52] U.S. Cl. ............................ 264/63; 264/66; 264/67; 416/241 B
[58] Field of Search .................... 264/63, 66, 67; 416/241 B

[56] References Cited

U.S. PATENT DOCUMENTS

| | | | |
|---|---|---|---|
| 3,988,866 | 11/1976 | Booher, Jr. | 51/283 |
| 4,408,959 | 10/1983 | Long et al. | 416/241 B |
| 4,460,527 | 7/1984 | Kato | 264/65 |

Primary Examiner—James Derrington
Attorney, Agent, or Firm—Parkhurst & Oliff

[57] ABSTRACT

A method of producing a radial type ceramic turbine rotor having a shaft, a hub connected thereto, a blade portion radially extending from the hub whose end on an air exit side extends from an end of the blade portion on the air exit side, comprises steps of injection molding a ceramic material into a ceramic rotor body and machining extra thicker portions of the molded rotor to a predetermined shaped turbine rotor.

According to the invention, the molded rotor is formed by the injection molding so as to be at least 0.5 mm thicker than a predetermined thickness at a fillet between the hub and the blade portion on the air exit side and the molded rotor is then machined by a diamond wheel to remove the extra thicker portions until the thicker fillet becomes to the predetermined thickness to from a predetermined shaped turbine rotor which is free from cracks to have a high strength.

7 Claims, 1 Drawing Figure

METHOD OF PRODUCING RADIAL TYPE CERAMIC TURBINE ROTOR

BACKGROUND OF THE INVENTION

1. Field of the Invention

This invention relates to a method of producing a high strength radial type ceramic turbine rotor which is free from cracks in the proximity of a connection between a hub and a blade portion on an air exit side of the rotor.

2. Description of the Prior Art

Recently, silicon ceramic materials such as silicon nitride, silicon carbide, sialon and the like have been noticed as structural materials for gas turbine, diesel engines and the like, because of their light weight and superior heat and thermal shock resistance. Particularly, radial type turbine rotors made of these ceramic materials have been highlighted for applications to gas turbine rotors or turbo charger rotors for automobiles, because these ceramic rotors are lighter and are capable of being used at much higher temperatures than metal turbine rotors and are superior in thermal efficiency to the metal rotors. Moreover, because the radial type turbine rotors are complicated in shape, they are usually molded by an injection molding process, or the like, which forces the ceramic materials into narrow or curved portions or corners of the complicated shapes.

In order to form the rotors by an injection molding of the ceramic materials, a great amount of plasticizer such as resin, wax or the like must be added into the ceramic material. When the injection molded ceramic rotor body is heated or sintered to remove the resin or wax, the shape in the proximity of a connection between a hub and a blade portion on an air exit side so rapidly changes that the resin or wax added as the plasticizer is not uniformly removed. Accordingly, the molded body is not uniform in density, so that locally different shrinkages occur in the body during sintering, resulting in tensile forces which lead to cracks, particularly in the connection between the hub and blade portion on the air exit side.

SUMMARY OF THE INVENTION

It is an object of the invention to provide an improved method of producing a radial ceramic turbine rotor of high mechanical strength which eliminates the above disadvantages of the prior art methods.

This object can be achieved by the method according to the invention of producing a radial type ceramic turbine rotor consisting of a shaft, a hub connected threreto, a blade portion radially extending from said hub whose end on an air exit side extends from an end of said blade portion on the air exit side, said method comprising the steps of injection molding a ceramic rotor body having a thicker fillet than a predetermined thickness at a connection between said hub and said blade portion on the air exit side, and machining said thicker fillet portion of said molded rotor body until said thicker fillet equals its predetermined thickness.

The invention will be more fully understood by referring to the following detailed specification and claims taken in connection with the appended drawings.

DETAILED DESCRIPTION OF THE PREFERRED EMBODIMENT

Figure 1:
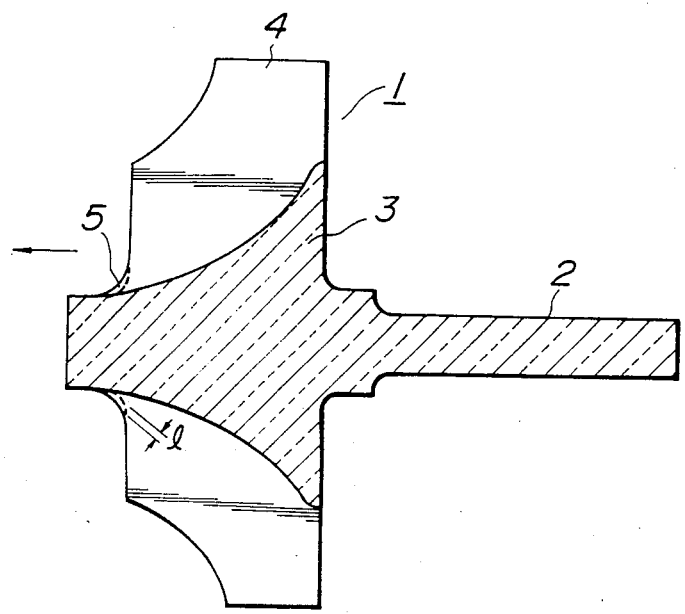
FIG. 1 is an illustration of a radial type ceramic turbine rotor having a thicker fillet portion according to the present invention.

FIG. 1 illustrates one example of a ceramic turbine rotor having a thicker fillet portion according to the present invention. The ceramic turbine rotor 1 consists of a shaft portion 2, a hub 3, and blade portion 4 radially extending from the hub 3. A gas is exhausted by the rotor in a direction shown by an arrow in the drawing in which direction an end of the hub 3 extends somewhat from an end of the blade portion 4. A reference numeral 5 illustrates an arcuate fillet formed at a circular connection between the hub 3 and the blade portion 4.

The ceramic turbine rotor is produced in the following manner. The rotor consists of a material selected from silicon nitride, silicon carbide, sialon or substances which convert to these materials by sintering. This starting material is mixed with a plasticizer such as a resin, wax or the like and further preferably is added and mixed with at least one sintering aid such as $Y_2O_3$, $MgAl_2O_4$, MgO, $CeO_2$, SrO or the like in case of the silicon nitride. Sintering aids such as Be, Al, B, C or the like can be added to silicon carbide to obtain a raw material for molding. This prepared raw material is injection molded by the use of injection molding dies to obtain a molded rotor body whose fillet 5 is thicker by an amount l, as shown in FIG. 1 by solid lines, than the predetermined thickness of an ultimate rotor product as shown by the broken lines in FIG. 1. The value l at the maximum thickness is not less than 0.5 mm, preferably not more than 5 mm, more preferably in the order of 1–3 mm. In this case, the fillet is preferably concave in a longitudinal section passing through a rotating axis of the rotor. However, it may be flat or convex.

The molded rotor body is heated up to 300°–600° C., to remove the plasticizer, such as the resin and wax or the like, at a heating rate slower than 100° C./hr, preferably slower than 10° C./hr. These heating conditions are dependent upon the kinds and amounts of plasticizer contained in the body. After the removal of the plasticizer, hydrostatic pressure is applied to the rotor body after presintering.

The presintering is effected at 800°–1,200° C. in order to facilitate handling the rotor body and give it a requisite strength for machining. After the plasticizer is removed, hydrostatic pressure is applied, the molded rotor body is covered with an elastic bag and then a hydrostatic pressure of 500°–5,000 kg/cm$^2$ is applied to the covered rotor body to increase the density of the rotor body. Thereafter, the molded rotor body is sintered for 10–200 minutes at a temperature of for example, 1,600°–2,200° C., which is sufficient to sinter the body completely, depending upon the raw material. When the starting material is silicon nitride, silicon carbide or sialon, or the starting materials are substances which produce these materials, important parameters for obtaining good sintering results are not only the sintering temperature, but also the sintering. For example, a nitrogen atmosphere is used for the silicon nitride and an argon atmosphere is used for the silicon carbide.

Thereafter, the sintered rotor body is machined to reduce the thicker fillet portion to its predetermined size and shape. The machining may of course be effected after the heating for removing the plasticizer or after the presintering. Jigs or tools may be suitably selected according to materials, shapes or sintered degrees of the injection molded bodies. For example, conventional cutting tools or diamond wheels may be used for machining the bodies after heating for de-plasticizing or presintering, or diamond wheels may be preferably used after sintering. The machining of the thicker fillet portions is preferably made so as to form the aforementioned fillet whose radius of curvature, in section, is greater than 0.5 mm in an ultimately finished condition.

According to the invention, a perfect rotor without any cracks can be obtained because of less localized difference in contraction due to uniform density resulting from the uniform removal of the plasticizer and a gradual variation in thickness obtained by injection molding a thicker fillet at the connection between the hub and blade portion on the air exit side of the rotor. Moreover, the larger the radius of curvature of the fillet of a finished rotor body, the thinner the fillet of a molded rotor body can be. On the contrary, the smaller the radius of curvature of the fillet, the thicker the fillet should be. At any rate, the thickness l of the fillet must be more than 0.5 mm.

If the fillet of an injection molded rotor body is less than 0.5 mm, the aforementioned uniform removal of the plasticizer and hence uniform density of the body cannot be achieved to obviate the differential contraction at the fillet and the rotor will contain undesirable cracks.

The effect of the invention will be explained with reference to examples hereinafter.

EXAMPLE 1

For preparing a raw material for injection molding, the following materials were mixed and kneaded, 100 parts by weight of powder $Si_3N_4$ having an average grain diameter 0.5 $\mu$m, 3 parts by weight of MgO, 2 parts by weight of SrO and 2 parts by weight of $CeO_2$ as sintering aids and 15 parts by weight of polypropylene resin as a plasticizer. The thus obtained material was injection molded with dies to form ceramic turbine rotors each having a thickness l of 2 mm at the fillet for producing radial type turbine rotors each having a maximum blade diameter 60 mm (after firing) and a radius of curvature 0.5 mm of the fillet at a connection between a hub and blade portion on an air exit side of the rotor. Thereafter, the molded rotor bodies were heated to 500° C. at a heating rate 5° C./hr and further heated at 500° C. for 10 hours to remove the plasticizer. The bodies were then sintered in a nitrogen atmosphere at 1,720° C. for 30 minutes. No crack occurred in the fillets or at any other portion in the sintered rotor bodies. The rotor bodies were ground by diamond wheels to remove the thicker fillet portion of each rotor until the radius of curvature of each fillet was 0.5 mm. In this manner, radial type ceramic turbine rotors were obtained, each of which was a perfect rotor without any cracks having a predetermined shape and a 0.5 mm radius of curvature at the fillet between the hub and a blade portion on the air exit side of the rotor. In order to compare therewith, the same raw material was injection molded with dies having 0.5 mm rounded edges which directly corresponded to the final fillet size and rotor bodies without thicker fillets were produced. Cracks having a length of about 5 mm occurred in ends of hubs after removal of the plasticizer therefrom.

EXAMPLE 2

A raw material for injection molding was prepared by mixing and kneading 100 parts by weight of powder SiC having an average grain diameter 0.2 $\mu$m, 2 parts by weight of boron, 2.5 parts by weight of carbon black and 10 parts by weight of wax as a plasticizer. The raw material was injection molded with dies to obtain rotor bodies 1, 2 and 3 having respective thicknesses of 2, 1 and 0 mm at fillet portions threof. Each of the radial type ceramic turbine rotors each had a maximum blade diameter of 110 mm (after firing) and a radius of curvature of 2 mm at the fillet portions between the hub and blade portions on an air exit side of the rotor.

Thereafter, the molded rotor bodies were heated to 400° C. at a heating rate 3° C./hr and further heated at 400° C. for 5 hours to remove the plasticizer. The bodies were then sintered in an argon atmosphere at 2,100° C. for 60 minutes. The sintered rotor bodies Nos. 1 and 2 were ground by diamond wheels to remove the thicker fillet portions until radii of curvatures at the fillets became 2 mm, to obtain rotors without any cracks. Furthermore, the sintered rotor bodies No. 3 which did not have thicker fillet portions, exhibited cracks of about 3 mm in the proximity of the fillets.

In order to carry out rotating tests, the rotors Nos. 1, 2 and 3 were dynamically balanced up to a dynamic unbalance of 0.05 g.cm. After metal shafts had been secured to the rotors, they were again adjusted up to a dynamic unbalance of 0.0005 g.cm. The rotors were then tested on a rotation testing machine progressively increasing its rotating speed. Both the rotors Nos. 1 and 2 did not rupture even at 70,000 RPM, while the rotors No. 3 commonly ruptured at approximately 40,000 RPM.

As can be seen from the above description, according to the invention, a rotor body is formed by injection molding so as to have a thicker fillet than a predetermined thickness at a connection between a hub and a blade portion on an air exit side of the rotor and then machined to remove the thicker portions to obtain a high strength ceramic turbine rotor completely precluding cracks, which is suitable for a turbo-charger rotor for diesel and gasoline engines and a rotor for gas turbine engines and very useful for the industry.

While the invention has been particularly shown and described with reference to preferred embodiments thereof, it will be understood by those skilled in the art that the foregoing and other changes in form and detail can be made therein without departing from the spirit and scope of the invention.

What is claimed is:

1. A method of producing a radial type ceramic turbine rotor having a shaft, a hub having an air entrance side and an air exit side and being connected to said shaft, a blade portion radially extending from said hub, said air exit side of said hub axially extending further than said blade portion, said method comprisng the steps of predetermining an appropriate size and shape for a fillet portion which is located on said air exit side of the hub at a connection between said hub and blade portions, injection molding a ceramic rotor body such that it has a thicker fillet portion than said predetermined fillet portion, said thicker fillet portion being at least 0.5 mm thicker than said predetermined fillet portion, heating said injection molded rotor body for removing a plasticizer therefrom, machining said thicker fillet portion of said molded rotor body until said thicker fillet portion becomes the same size and shape of said predetermined fillet portion and sintering said molded rotor body.

2. The method of claim 1, wherein said thicker fillet portion is concave in a longitudinal-section passing through a rotating axis of said molded rotor body.

3. The method of claim 1, wherein a ceramic material to be injection molded comprises at least one material selected from the group of materials consisting of silicon nitride, silicon carbide, sialon and substances which produce these materials when sintered.

4. The method of claim 1, further comprising pre-sintering said molded rotor body after said machining step and said sintering of said molded body occurs after said pre-sintering step.

5. The method of claim 1, further comprising pre-sintering said molded rotor body after said heating thereof and prior to said machining step and said sintering of said molded rotor body occurs after said machining step.

6. The method of claim 1, wherein said sintering of said molded rotor body occurs after said heating step and prior to said machining step.

7. The method of claim 1, further comprising pre-sintering said molded rotor body after said heating step, and machining said molded rotor body after said sintering of said molded body.

* * * * *